United States Patent
Bair et al.

(10) Patent No.: US 7,153,436 B2
(45) Date of Patent: Dec. 26, 2006

(54) METHOD FOR ENHANCING CYCLONIC VESSEL EFFICIENCY WITH POLYMERIC ADDITIVES

(76) Inventors: Patrick W Bair, P.O. Box 2216, Glen Rose, TX (US) 76043; Charlynn Bair, P.O. Box 2216, Glen Rose, TX (US) 76043

(*) Notice: Subject to any disclaimer, the term of this patent is extended or adjusted under 35 U.S.C. 154(b) by 0 days.

(21) Appl. No.: 10/365,768

(22) Filed: Feb. 13, 2003

(65) Prior Publication Data

US 2004/0159613 A1   Aug. 19, 2004

(51) Int. Cl.
*C02F 1/56* (2006.01)

(52) U.S. Cl. ............ 210/709; 209/5; 210/710; 210/727; 210/734; 210/738; 210/744; 210/787

(58) Field of Classification Search ........... 209/5; 210/710, 725, 727, 728, 734, 738, 787, 788, 210/512.1, 747
See application file for complete search history.

(56) References Cited

U.S. PATENT DOCUMENTS

| | | | | |
|---|---|---|---|---|
| 3,929,633 A | * | 12/1975 | Visman et al. | 210/732 |
| 4,357,242 A | * | 11/1982 | Chandler | 210/712 |
| 4,738,783 A | * | 4/1988 | Sugihara et al. | 210/705 |
| 4,767,540 A | | 8/1988 | Spitzer et al. | |
| 5,338,459 A | * | 8/1994 | Hirose | 210/710 |
| 5,366,639 A | | 11/1994 | Jones et al. | |
| 5,480,559 A | * | 1/1996 | Smisson | 210/727 |
| 5,819,955 A | | 10/1998 | Clarke | |
| 5,843,315 A | | 12/1998 | Baughn et al. | |
| 5,951,955 A | * | 9/1999 | Flieg et al. | 423/121 |
| 5,954,854 A | * | 9/1999 | Inoshita et al. | 75/10.12 |
| 6,238,579 B1 | | 5/2001 | Paxton et al. | |

OTHER PUBLICATIONS

Moore, "Drilling Practices Manual" 1981 pp. 154-175.
Shelley & Scheiner Large-Scale Dewatering of Phosphatic Clay Waste From Northern Florida Buhines RI-8928.
Linatex Corporation of America; Linatex Separator Product Brochure.
Derrick Corporation; "Hi-G Dryer" Product Brochure; Bulletin 3000.
Mortimer "Synthetic Polyelectrolytes—A Review". 1991 Polymer International pp. 29-41.
Moyno Inc; Moyno 1000 Pump Service Manual.

* cited by examiner

*Primary Examiner*—Peter A. Hruskoci
(74) *Attorney, Agent, or Firm*—Guy V. Manning

(57) ABSTRACT

The present invention is directed to a novel method and system for enhancing the efficiency of hydraulic centrifugal separators (cyclones) in the removal of fine size particles from a liquid carrying medium. More particularly, it is concerned with improvements in the removal efficiency of any number of cyclonic devices that rely on the use of centrifugal force to separate fine size particles of differing density from the liquid carrying medium by addition of polymeric additives, both before, and, as necessary, inside the cyclone body.

26 Claims, 4 Drawing Sheets

METHOD FOR ENHANCING CYCLONIC VESSEL EFFICIENCY WITH POLYMERIC ADDITIVES

BACKGROUND OF THE INVENTION

1). Field of the Invention

The present invention relates to a method for removing, and/or recovering fine size particles from a liquid carrying medium utilizing devices which separate under the influence of centrifugal force disposed within a vortex body, through the addition of polymeric additives The present invention also relates to a system for recovering fine size particles from the liquid carrying medium utilizing devices which separate under the influence of centrifugal force disposed within a vortex body. The method and system have particular applicability in the mineral aggregates industry, including, but not limited to; phosphate production, granite, sandstone, limestone, and igneous rock production. Additionally, alumina manufacture via the Bayer Process, and Titanium Dioxide manufacture via the Chloride Process, as well as waste neutralization tailings from the same Chloride/Sulfate process, may also utilize this method and system.

2). Description of Prior Art

The efficient and cost effective removal, and or recovery of very fine solids has presented many problems for various mineral and aggregate producers over the years. There are some uses for aggregate fines materials. Granite and sandstone and igneous fines can be recovered and added to existing base material production, or used in the ceramics industry. Ag-Lime can be used as a soil enhancer. However, it is necessary for these fines to be separated quickly and completely, and in a fairly tight specification, for addition to the existing stockpiles.

Hydraulic centrifugal separators, or cyclones/hydrocyclones have long been utilized to remove some of the larger particles in a fluid process stream. The primary disadvantage to these devices being the inability to remove very fine size solid particles without resorting to multiple small diameter units. Even then, these cyclonic vessels are typically unable to remove solids smaller than −325 mesh. Numerous attempts to add polymeric additive(s) prior to the cyclone have been disappointing. This is largely due to the extremely high vector forces inside the hydraulic centrifugal vessel shearing the flocculated particles.

The most common means of removing fines generated in the production process has been to hydraulically move the fine particle stream to a retention pond for gravity settling. Typically, some flocculating agent has been added to the stream as it enters the Pond to aid in settling even the very smallest particles. Water is pumped back to the process from these ponds.

If space permits, these ponds are allowed to fill with solids before being taken out of service and undergo evaporative drying, otherwise, they are cleaned while in service. This has involved the use of draglines, clamshells, and dredges to remove the partially dry solids. Then watertight trailers must be used to haul the material to a disposal area. This operation is quite costly, and disruptive to normal plant activities, additionally, manpower and machinery normally dedicated to production must be employed for this task.

Additional disadvantages to this system include the loss of water from the ponds due to evaporation,. Large pumps are required to transport the fines to the ponds, and then move water back to the plant area. Added electrical requirements are high.

In the case of beneficiation of Phosphate ore, the principle waste stream is a phosphatic clay which responds poorly to conventional liquid-solid separation techniques. Large-Scale Dewatering of Phosphatic Clay Waste From Northern Florida, Bureau of Mines Report of Investigations, 1985, details the extremely low settling rate of these clays-typically requiring several years for the material to thicken from 3% to 20%. The discharge of these clay wastes to settling areas can be as high as 200,000 gal/min. To accommodate these waste steams, huge impoundment areas must be constructed, ranging in size from 400–600 acres at a height of 40'.

The main reason for the slow settling of these clays is due to their make-up. Major constituents are apatite, quartz, montmorillonite and attapulgite, along with smaller amounts of kaolinite, illite, and dolomite. Several of these being "swelling" clays. Due to the very slow settling times, Evaporation of the water pumped to the ponds is significant, amounting to nearly 10% of the total volume, or 5 tons of water for every ton of phosphate produced.

Disadvantages for this system are many, including the large amount of land needed to accommodate the solids. Energy consumption for the many pumps to move the slurry through the dike system. Water consumption, especially in times of drought.

Additionally, new environmental permitting processes are becoming more stringent and costly to meet.

In the Bayer alumina process, aluminate liquor leaving the flashing operation contains from 2–20% solids. These solids consist of both insoluble products that precipitate during digestion, along with residue that remains after the reaction between bauxite ore and caustic. According to U.S. Pat. No. 4,767,540, in order to rapidly settle the finer solids particles from the liquor, a flocculant such as a hydroxamated polyacrylamide is added to the slurry. This slurry is then sent to very large Settling Vessels, where the overflow of "green" liquor still may contain from 10–100 mg/liter of suspended solids. These solids must be filtered from the liquor. Likewise, the "red mud" (settled solids) are withdrawn from the bottom of the Settler and passed through a countercurrent washing circuit for recovery of sodium aluminate and caustic soda.

The cost and space requirements for the Settlers is large, and requires several operators to oversee. Upsets in the Settlers can lead to large amounts of fines to be filtered. This significantly slows the process, thus increasing production costs. Fine solids escaping the filtration step can cause undesirable impurities such as iron or titanium in the final product.

In recent years, a number of fines treatment processes have been introduced to address these problems. Cyclone separators have been used to separate a variety of materials from each other in accordance with their relative densities. U.S. Pat. No. 2,377,524 references the use of cyclone separators to separate solid particles from liquids. Accordingly, a feed mixture containing solid particles is introduced into a separating chamber via one or more tangentially directed inlet adjacent to the large end of the separating chamber. A fluid vortex is thereby created. The centrifugal forces created by the vortex move the more dense solids outwardly to the wall of the separating chamber, while the less dense materials (liquid and solids), are brought to the center of the chamber-there to be carried along by an inwardly located helical stream which surrounds the axially disposed "air core". The less dense components are discharged through the overflow outlet. The denser material continues to spiral along the interior wall of the hydrocyclone and eventually exit by the underflow outlet (apex).

A rotating screen apparatus, such as that described by U.S. Pat. No. 5,366,639 has been used to separate relatively course material (2.00 mm to 0.050 mm) from fine particles in a liquid stream.

U.S. Pat. No. 5,819,955 describes a hydrocyclone device that includes an axial feed inlet that may further contain an outlet orifice surrounded by many flexible sectors which, in turn, are composed of resilient material. The separating chamber may also contain riffles, or grooves, to aid in separation of several solid, or liquid fractions.

U.S. Pat. No. 5,843,315 describes a method for introducing feed into a sand screw, with the larger particles separated from the fine particle stream. The fine particle stream is then introduced into a hydraulic centrifugal separator, which removes most particles larger than 200 mesh. The fine particle overflow from the hydrocyclone is treated with a polymeric additive and sent to a thickening tank. The underflow stream from the thickening tank is then fed to a belt filter press unit. This material is then transported back to re-blend for incorporation in the base, or discarded.

Derrick Corp., Hi "G" Dryer product brochure, Bulletin 3000, presents a technology that consists of a high frequency, linear motion vibrating screen that is fed fine particles from a cluster (8, 12, or 24) 4" hydrocyclones Typical recoveries of from 50–80% of the fine solids in the stream, with the rest traveling with the overflow to a holding pond. Solids are in stackable form @ 70–80% solids.

U.S. Pat. No. 6,238,579 details a new type of hydrocyclone that provides for discharge (exit) ports for exit fluid flow at or adjacent to one another on one end of a vortex separating body; an inlet port(s) disposed at one end of a separating body having discharge (exit) ports for exit fluid flow disposed or adjacent to one another at an opposite end of the separating body.

All of the aforementioned methods and devices suffer from several deficiencies:

1). None of the prior art incorporate polymeric additives to increase the size of fine particles introduced into the hydrocyclone unit.

2). The current technologies require several pieces of separation equipment. Space requirements are often large, and all require some type of supervision and maintenance. Additionally, these processes do not eliminate the need for a clarifier, thickening tank, or holding pond, since the fine solids cannot be removed within one piece of equipment.

3). The combinations of equipment required are quite costly.

4). Cost and power requirements are significant in some of the applications.

5). Dredging and Dragline operations are not eliminated, only reduced.

6). Dried particles must be transported back to re-blend before adding back to the base.

7). Polymer additions are still necessary in virtually all of the applications.

8). Equipment wear and tear is high, due to the abrasive nature of the fine solids.

9). Typical applications require that multiple small cyclones (4") be employed to remove fine particles larger than 300 mesh. This requires that extra cyclones be purchased, exclusive of the cyclones already on location. Material smaller than 325 mesh is rarely removed by cyclones.

10). Some applications, such as titanium dioxide pigment productions, and aluminum "red mud" filtration cannot be economically performed using current cyclone technology, due to excessive fine particle carry-over.

The method and system of the present invention is designed to more effectively remove fine suspended particles from any number of process streams. The improvements forming the basis of the present invention lie in adding polymeric additives to said process streams prior to introduction into hydraulic centrifugal separator(s). Said hydraulic centrifugal separator(s) having been modified to improve fines removal efficiency. This treatment leads to dramatically reduced levels of suspended fine particles in the cyclone overflow when compared to existing technology. Such reductions in suspended fine solids can lead to lower equipment and space requirements, a decrease in energy requirements, along with recapture of valuable products. Additionally, maintenance of equipment is significantly lowered due to the lubricity imparted to the fine solid particles by the polymeric additives.

SUMMARY OF THE INVENTION

It is the object of the present invention to provide a method and system for removing, and/or recovering aggregate (granite, sandstone, limestone, or igneous material), "red mud", titanium dioxide pigment, titanium dioxide neutralization waste, and phosphate clay fine particles from a liquid carrying medium.

According to the first aspect of the invention, a novel method for combining specific polymeric additives in a liquid stream containing fine suspended solid particles to enhance cyclone performance. The object of the invention being to increase fine particle size and strength to withstand angular (rotational), axial, and radial, and other forces, thereby dramatically increasing solids underflow discharge volume, along with lower suspended solids in the overflow. The method preferably includes the following steps:

(a). introduce a liquid cationic coagulant, if necessary, into the liquid stream containing fine particles, at a sufficient distance before the hydrocyclone to insure optimum solids contact.

(b). introduce an anionic/nonionic copolymer blend solution into the liquid stream containing fine particles, between 100' to 20' before the hydrocyclone to allow for proper mixing, and optimum dosing.

(c). introduce a structured cationic copolymer blend solution into the liquid stream containing fine particles, within 10' of the hydrocyclone feed inlet, to allow for adequate mixing.

(d). introduce the same structured cationic copolymer blend into the liquid stream containing fine particles, three feet to six inches (3' to 6") before the inlet of the cyclone, preferably by means of a polymer injection ring.

(e). introduce the hydrocyclone overflow stream, which may contain a small amount of solids due to vortex turbulence, into a cone bottom tank equipped with weirs.

(f). solids collected in the cone bottom area of the tank can be either gravity flowed into the existing base material hopper, a stockpile, or conveyed to another area for re-blend/ disposal. Flocculated solids are gravity fed, or pumped, after exiting an automatic bottom dump valve operated by redundant conductance or level probes.

(g). introduce additional structured cationic copolymer blend solution, if needed, through a polymer ring located above the apex (underflow discharge) of hydrocyclone for additional gravity or mechanical dewatering and subsequent fine particle material mixing or stacking.

(h). discharge cyclone underflow solids onto base material conveyor, bin, or stockpile.

A second aspect of the invention is a novel system for combining polymeric additives in a liquid stream containing fine suspended solid particles. The system preferably includes:

(a). A length of pipe before the entrance to the cyclone to allow for proper mixing of polymeric additions.

(b). A number of collars and check valves "hot tapped", welded, or affixed to the pipe to allow for injection of the polymeric additives before the cyclone(s).

(c). A polymer injection ring mounted just in front of the hydrocyclone feed inlet, to allow for optimal contact of polymeric solution and the fine solids stream.

(d). An optional additional upper cone section for added mixing of polymer additives with fine solid particles. This enlarged chamber will also act to reduce particle carry-over by reducing turbulence caused by tangential, axial, rotational, or other forces.

(e). A polymer injection ring mounted at or just above the apex (spigot) of the hydrocyclone for addition of cationic copolymer additive.

(f). underflow regulator and overflow siphon regulator to control fine solid particle discharge from hydrocyclone underflow. Preferably located near ground level for ease of operation.

(g). polymeric additive system, including solution feed pumps "slaved" to the process flow through a PLC (Process Loop Controller) to allow for automated control.

(h). for solids, or soda recovery, a cyclone mounted over base, titanium dioxide, bauxite red mud, or other material bin, stockpile, or conveyor.

(i). for solids removal, flocculated fine solid particles transported from the cyclone underflow to stockpile for continued gravity dewatering, or to a rotating screen device, or vibrating screen apparatus to remove excess water.

(j). a cone bottom tank equipped with weirs to trap any excess flocculated solids carry-over with the cyclone overflow; providing a clean fluid stream for recycle to the process (k). employ gravity flow, pump, or screw auger to transport flocculated solids from the bottom of the tank back to a point in the above mentioned process.

Other objects and aspects of the present invention will become apparent to one of ordinary skill in the art upon review of the specifications, drawings, and claims appended hereto.

DETAILED DESCRIPTION OF THE PREFERRED EMBODIMENTS OF THE INVENTION

Figure 1:
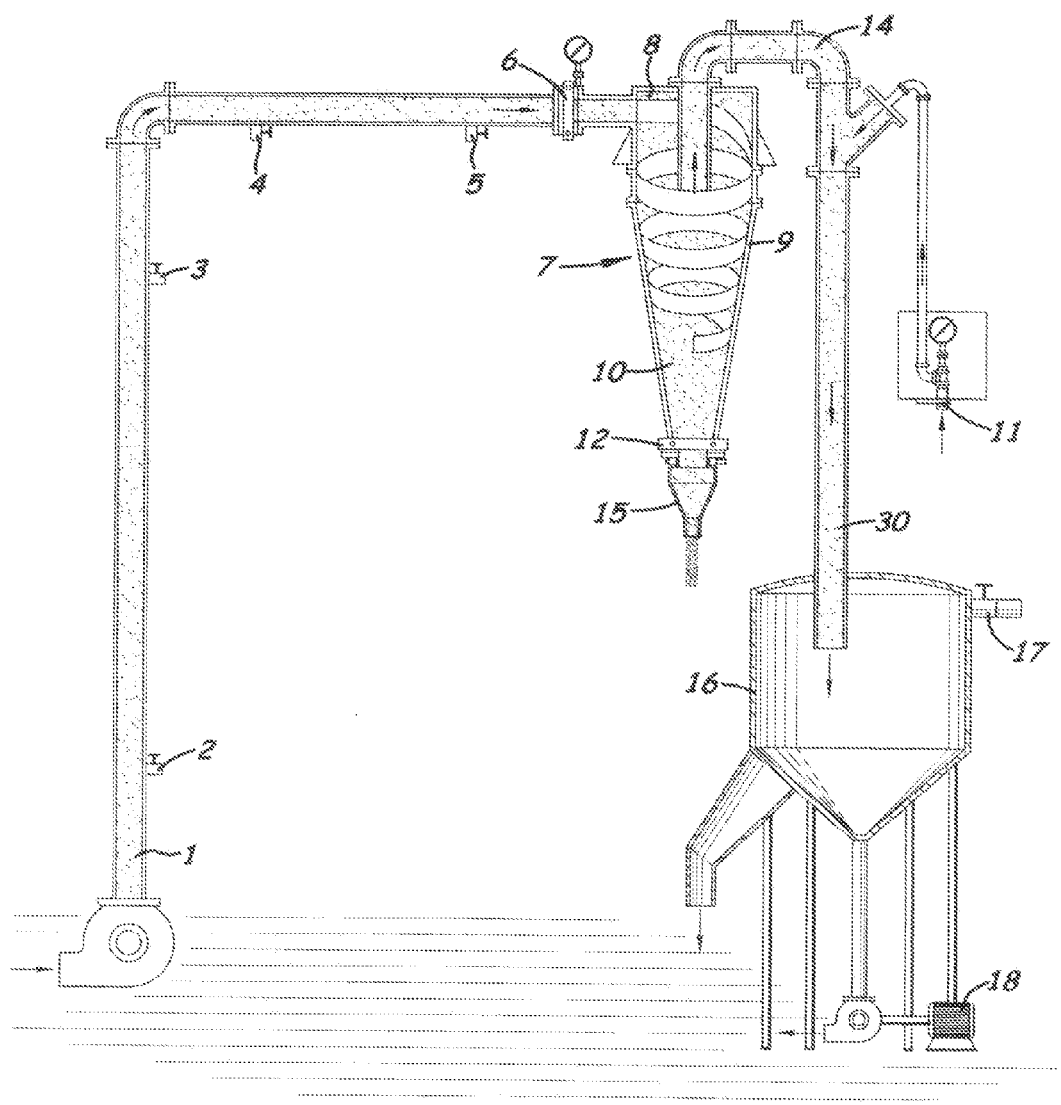
FIG. 1 illustrates a process flow for removing/recovering fine size particles from a liquid carrying medium, according to the present invention.

The method for recovering fine size particles from a liquid carrying medium include the following steps:

a). Introducing a cationic coagulant, if necessary, into a process stream containing fine particles from a sand screw, or screen, for aggregates; flash tank effluent for aluminate liquor; precipitation underflow stream for titanium dioxide pigment; neutralization waste stream from titanium dioxide chloride/sulfate process, or phosphate beneficiation waste material, at sufficient distance before hydraulic centrifugal separator(s), or cyclone(s) to insure optimum mixing.

b). Introducing an anionic/structured nonionic copolymer, or copolymer blend solution into the process stream containing fine particles, at sufficient distance before the cyclone to insure proper mixing.

(c). Introduce a structured cationic copolymer, or copolymer blend solution into the process stream containing fine particles, one foot to ten feet (1' to 10') before the cyclone feed inlet to allow for adequate mixing.

(d). Introduce the same structured cationic copolymer, or copolymer blend, solution into the process stream containing fine particles directly before the feed inlet to the cyclone, preferably by means of a polymer injection ring.

(e). Introduce cyclone overflow stream, which may contain small amounts of flocculated fine particles, into a cone bottom tank equipped with baffles and weir(s).

(f). Remove solids from bottom of tank by gravity, pump, or other means, and return to a point in the above process for further refinement, or stockpiling, as the situation warrants.

(g). Removal of solids from the bottom spigot (apex) of the cyclone, and add to either base material, return to the process for further refinement steps, or send to a stacking area for further dewatering. A rotating screen apparatus, or vibrating screen may also be used to dewater before stacking the flocculated fine particle material.

A second aspect of the invention is a novel system for combining polymeric additives in a liquid stream containing fine suspended solid particles. The system preferably includes:

(a). A length of pipe, of sufficient size for the flow, before the entrance to the cyclonic vessel(s) to allow for proper mixing of the polymeric additives.

(b). A number of collars, with check valves, either "hot tapped", or somehow affixed into the pipe to allow for injection of the polymeric additives before the cyclonic vessel(s)

(c). A polymer injection ring consisting of four (4) or more injection points mounted in close proximity to the entrance of the cyclonic vessel(s) feed inlet.

(d). An optional additional cyclone upper cone section for added mixing of polymeric additives with fine solid particles. This added chamber being especially useful where extreme turbulence, caused by the intersection of tangential, axial, rotational, or other forces, would otherwise act to carry-over solid particles that would normally be discharged through the underflow stream.

(e). A polymer injection ring mounted at, or just above the apex (spigot) of the cyclone vessel for addition of a cationic copolymer additive solution.

(f). An underflow regulator and overflow siphon regulator to control fine solid particle discharge from the cyclone underflow. The overflow siphon regulator being accessible by operators at, or near ground level.

(g). polymeric additive system, including solution feed pumps "slaved" to the process flow through a PLC (Process Loop Controller) to allow for automated control.

(h). For solids recovery/recycle, cyclonic vessel(s) mounted over a conveyor, bin, or stockpile.

(I). for solids removal, flocculated fine solid particles transported from the cyclone underflow to stockpile for continued gravity dewatering, or to a rotating screen device, or vibrating screen apparatus to remove excess water.

j). For solids removal, a conveyor or other means to transport the flocculated particles to a holding area or stockpile for continued dewatering. This dewatering occurring as a function of the effectiveness of the polymeric additives in conjunction with the weight of the material in the stockpile.

(k). A cone bottom tank, equipped with baffles and weirs to trap any excess flocculated solid particles that carry-over with the cyclone overflow stream.

(l). Gravity flow, pump, or screw auger to transport the flocculated solids, exiting the bottom valve of the tank, back to a point in the above mentioned process.

As used herein, the term "fine", or "fines" refer to any solid particle that can pass through a 200 mesh screen.

As used herein, the "flocculated" refers to any solid particles that have been altered and enlarged by interaction with polymeric additives.

An added benefit of the invention is the ability to utilize larger diameter cyclonic vessels to remove fine size solid particles from the fluid stream, thereby reducing, or eliminating the need to employ multiple small diameter hydrocyclones for partial fines removal.

Various embodiments of the invention will now be described, by way of example, with reference to the accompanying drawings.

As seen in FIG. 1, fine size particles in a liquid carrying medium 1 are piped towards a cyclonic vessel 7. A cationic coagulant 2, if necessary, may be injected into the stream at a dosage of 1–20 ppm, based on total flow volume, some distance in front of the cyclonic vessel 7 to allow for proper mixing. The preferred method of use being dilution with water at a ratio of 1 part coagulant to 10–100 or more parts water, utilizing an inline static mixer. The preferred coagulant being a Poly (diallyl dimethyl ammonium chloride), (DADMAC) with a molecular weight of around 200,000, such as CCS-8624.

A second polymeric additive 3 & 4 is split fed to the stream to increase the size of the fine size particles in the carrying stream. The purpose of the split feed being to lower total chemical dosage, while maximizing fine particle size. Preferably, the flow to each injection point would be controlled by means of a valve and some type of flow totalizer, to optimize particle size. This anionic/structured nonionic copolymer blend solution is added at a concentration of 0.2–0.5% by weight at a dosage of 3–20 ppm, based on total flow volume-with the final dosing as close as 20' before the cyclonic vessel.

The preferred method of inversion of the polymeric blend being the use of a polymer inversion unit, such as that sold by Norchem Inc. An age tank of suitable size for the application should be employed to allow the anionic/structured nonionic copolymer blend solution maximum inversion, or yield, time. Dry powder versions of the above listed polymeric additives may also be employed. However, these products present different challenges, as equipment and time requirements are greatly increased for said powders. The solution is then injected into the process stream preferably with a progressive cavity pump such as that manufactured by Moyno Inc. The preferred constituent polymers for the blend being those manufactured by Cytec Industries., in a range of from 0–70 mole percent anionicity. For nonionic applications, the preferred polymer being a structured copolymer.

The final polymeric additive 5 & 6, is again split fed to the stream to both increase the size of the fine particles, as well as add shear strength. The preferred dosing of the structured cationic copolymer is 0–25% at 5, with 75–100% of the dosing occurring at 6. The dosing at the polymer injection ring 6 is key to the overall removal of fine particles in the cyclonic vessel 7, and is again regulated by valving and flow meter readings to achieve optimum results. The structured cationic copolymer solution is added at a concentration of 0.25–0.5% by weight. Dry powder alternatives are not as effective for this application as the emulsion counterpart, and are not recommended.

The preferred method of inversion, polymer ageing, and subsequent injection being identical to that described for the anionic/structured nonionic copolymer above. The preferred structured cationic copolymer(s) being those manufactured by Cytec Industries.

The hydraulic centrifugal separator(s), or cyclonic vessels 7 should be of sufficient size to accommodate both total fluid and solids flow. In some instances, multiple cyclonic vessels 7 could be required for effective removal of fine size particle solids from the process stream. Flocculated fine particle solids entering the cyclonic mixing chamber 8 are spun toward the outside of the vessel 7, due to centrifugal force. These denser solids spiral downward through the upper cone section 9 of the vessel 7, and down into the lower cone section 10. The vortex finder vacuum valve 11 is utilized to insure maximum removal of solids from the apex 12, or spigot, as well as clean fluid from the cyclonic vessel overflow 14.

To insure maximum removal of flocculated fine size particles, the cyclonic vessel 7 should be fitted with an apex 12 that is oversized for the anticipated flow. An automatic underflow regulator 15, or flexible rubber regulator is used to handle surge overloads, as well as tramp oversize material, without loss of said material in the overflow stream.

Fluid exiting the cyclonic vessel overflow 14 may still contain small percentages of flocculated particles that settle at rates greater than 60 meters/hour. This fluid is transported to a cone bottom tank 16, equipped with baffles 33 & weir(s) 34 (see FIG. 3) for the purpose of trapping these solids. Clean fluid is transported over the weir(s) 34, and discharges at exit valve 17 to be recycled back to the process by means of a pump 18. Flocculated particles are removed from the bottom of the tank 16 by means of either a pump 40, or gravity flow. The preferred cone bottom tank 16 and sundry equipment is available from Steel Industries/WSI.

These particles can then be reclaimed to a stockpile, or bin, for gravity dewatering or sent to a rotating screen device, or vibrating screen, such as that provided by Phoenix Process Equipment Co., for additional dewatering before stockpiling.

Flocculated particles exiting the apex 12 of the cyclonic vessel 7 can be handled in several ways: a). Flocculated solids can drop from the underflow apex 12 onto a conveyor belt (not shown), for transport to a bin or stockpile for further gravity dewatering. b). Flocculated solids can be dropped directly into a base material bin, or stockpile (neither shown), for blending, and sale. c). Flocculated solids can be transported to a rotating screen device, or vibrating screen (neither shown) for further dewatering.

Figure 2:
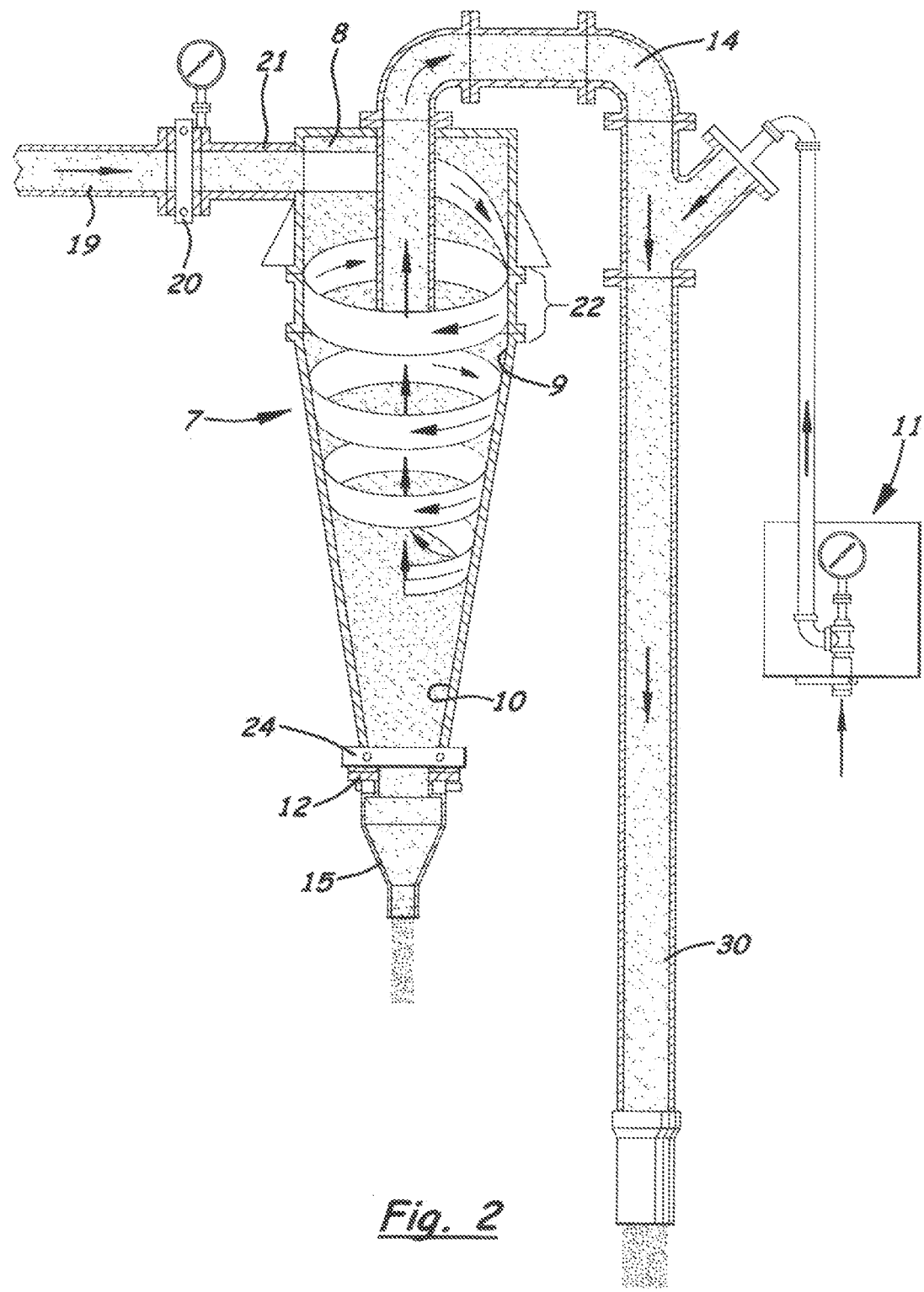
FIG. 2 illustrates a modified vacuum assisted hydrocyclone for removal/recovery of fine size particles from a liquid carrying medium, according to the present invention.
Figure 4:
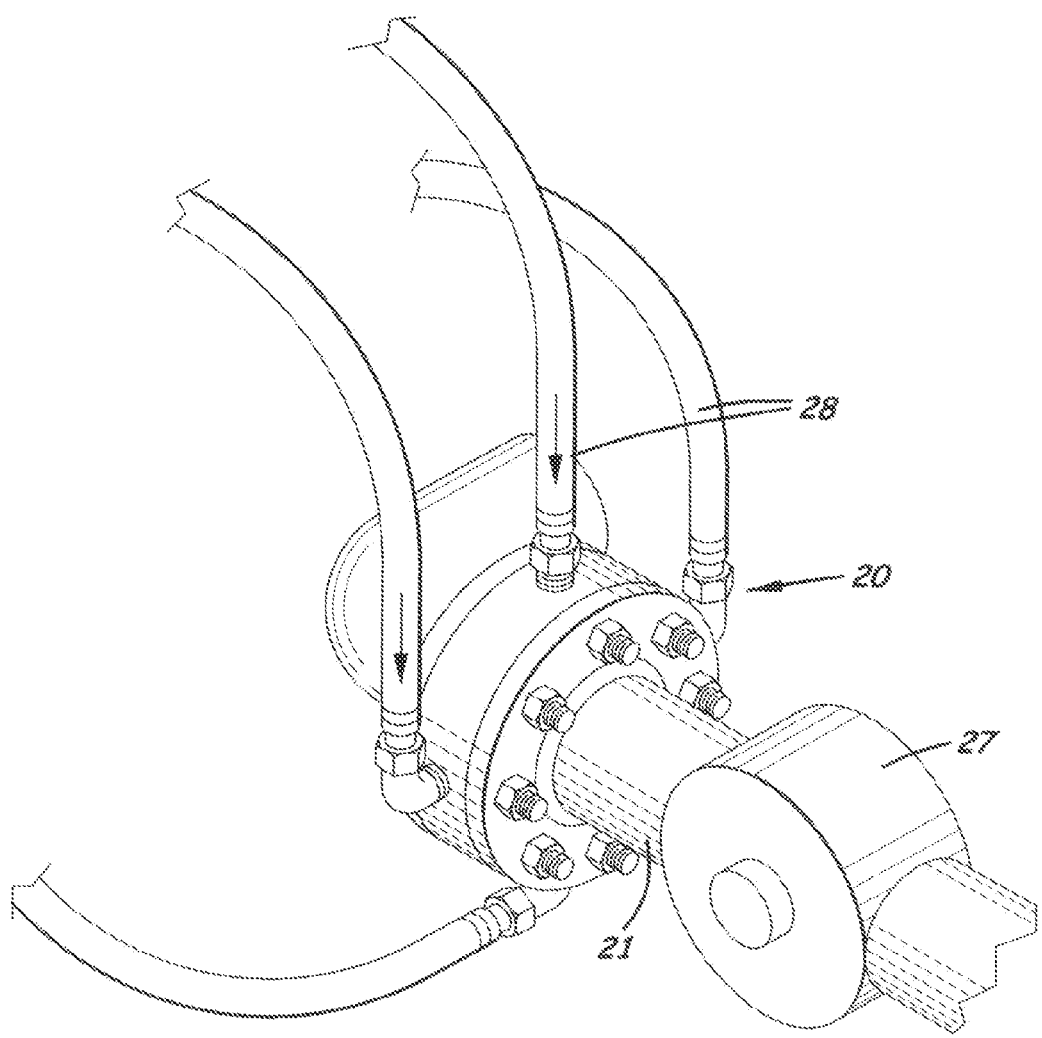
FIG. 4 illustrates a polymer ring used to evenly distribute a polymeric additive into the cyclone feed chamber, and, optionally, into the flocculated solids exiting the apex, or spigot, of the cyclonic vessel

FIG. 2 & FIG. 4 illustrates another embodiment of the invention. In FIG. 2, a fluid (process) stream containing fine size particles 19, passes through a polymer injection ring 6, located either before a throttling valve 27 (see FIG. 4) into the cyclonic vessel feed inlet 21, or immediately in front of the cyclone feed inlet 21 if no throttling valve 27 is present. The purpose of said polymer ring 6 is to evenly distribute, through a complete 360 degree circle, a structured cationic copolymer solution.

In FIG. 4, a close-up of the polymer ring 6, illustrates simple bolt-on flanges 24, 25 to abut to the cyclone feed inlet 21, or inlet feed throttling valve 27, along with the various polymeric solution injection lines 28. These polymer injection rings 6 are fabricated by a number of companies, such as Steel Industries/WSI. The close proximity of the injection allows for centrifugal forces to mix the polymer with the fine size solids and enlarge and strengthen immediately inside the cyclonic vessel 7.

Another aspect of the invention in FIG. 2 is the optional additional upper cone section, or spool 22. This additional section 22 aids in structured cationic polymeric additive mixing inside the cyclone body 7, along with decreasing the probability of flocculated particles being vortexed into the cyclone overflow 14. The mixing, along with the unique structure of the cationic copolymer, and its interaction with the fine size particles in the fluid stream 1, prevents shear of the particles inside the cyclonic vessel 7, before removal from the apex 12, or spigot.

Hydraulic centrifugal separators, and additional upper cone spools 22 are commercially available, such as those manufactured by METPRO Supply Inc.

Also shown in FIG. 2, optional polymer injection ring 6 may be bolted to either the top or bottom of the apex (spigot) 12 for injection of structured cationic copolymer solution employed for added dewatering at both the underflow regulator 15, or subsequent dewatering devices (not shown) or stockpile.

Figure 3:
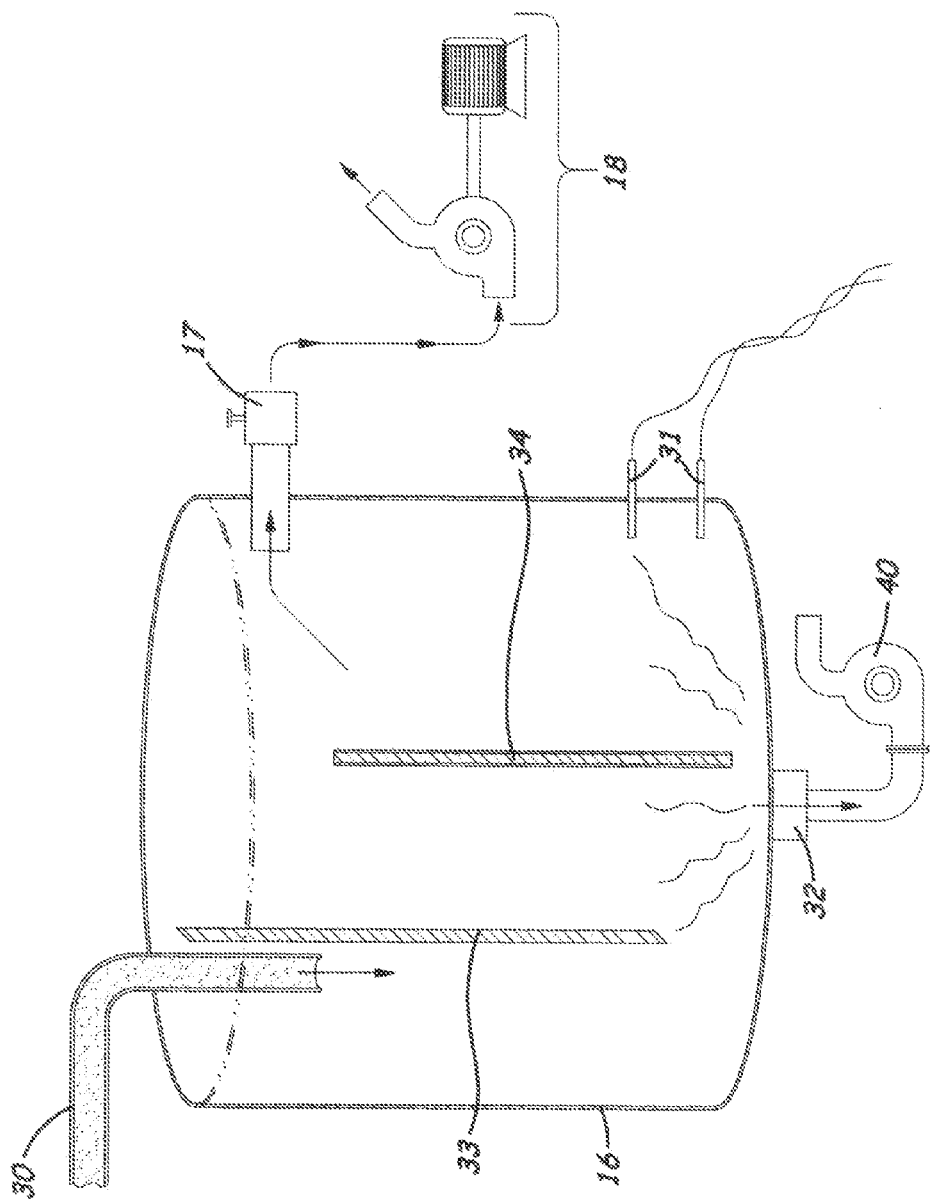
FIG. 3 illustrates a cone bottom tank equipped with baffles/weirs to recover excess flocculated particles from the hydrocyclone overflow, as well as providing clean fluid for recycle, according to the present invention.

FIG. 3 illustrates a cone bottom tank 16, that receives cyclone overflow 30, equipped with a set of high and low level conductance probes 31, that control a bottom dump valve 32, to discharge the flocculated solids, as they accumulate, to a base material bin, conveyor, dewatering device, or stockpile (not shown).

Said tank 16 is also equipped with a set of baffles 33, and weirs 34, to direct the solids to the bottom of the tank 16 and provide clean fluid at the fluid discharge valve 17.

Another novel aspect of the invention is the effectiveness of the polymeric additives in removing the fine size particles in a cyclonic vessel 7, thus discharging very small amounts of flocculated solids to the cone bottom tank 16. This allows the use of a much smaller cone bottom tank 16 than would normally be dictated. The small quantity of particles that are vortexed into the overflow 14 settle very rapidly, thus the tank 16 requires residence times of as little as 60 seconds for clear fluid. With the decrease in size, it is also possible to locate the cone bottom tank 16 much closer to the cyclonic vessel(s) 7. In fact, it is preferable to locate said tank 16 as close as practical, to decrease the distance for transport of the small quantity of flocculated particles settled in the tank 16.

Said cone bottom tank 16 and accessory equipment (not shown), along with a Process Loop Controller (PLC) (not shown) to integrate and automate the polymeric additive system and cone bottom tank 16 functions are readily available from Steel Industries/WSI. Clean fluid from the discharge 17 is available for recycle to the process.

The following examples illustrate the present invention. They are not to be construed to limit the claims in any manner whatsoever.

EXAMPLES 1 TO 5

To provide statistical data to substantiate the unique functions of the polymeric additives on fine size particle removal from a fluid stream, a standardized test procedure was employed. This procedure being as described below.

A representative 5 gallon sample of the fine size particle stream was obtained for testing. The concentration of total suspended solids, as expressed in percent (%) was first determined. Next, 400 ml samples of various polymeric additive solutions were prepared by inverting with a hand-held mixer, such as that supplied by Braun Inc. To 400 mls of plant (on-site) clean water in a 1000 ml beaker, 1 ml of neat polymer, or polymer blend, was injected and stirred with the mixer at high speed for 20 seconds. This produced a 0.25% solution, by volume, for subsequent testing.

Testing entailed agitating the 5 gallon sample to evenly distribute the particles, then extracting a 500 ml aliquot in a 1000 ml beaker. 5–10 ppm (1–2 mls) of the cationic coagulant is added to the beaker and the contents are mixed between two 1000 ml beakers vigorously 8 times. This is referred to as "boxing the sample". Then the anionic/nonionic copolymer is added at a dosage of 5–15 ppm (1–3 mls). Again, the sample is boxed as before. Solid size is observed, and noted for each polymer tested. The object being to obtain the largest, strongest flocculated particles at the lowest dosage.

Finally, the cationic copolymers are tested by adding to the samples at a dosage of 5–15 ppm (1–3 mls). These samples are then boxed vigorously 25 times to simulate shear within the cyclonic vessel. Samples are then poured over a 100 mesh 8" round sieve screen, with the underflow collected in a clean pan for subsequent TSS (Total Suspended Solids) analysis according to EPA 160.2 standard. Only samples of flocculated particles that remain intact are poured across the screen for subsequent TSS analysis.

Example 1

TABLE 1

Granite fines slurry from quarry wash water and sand screw overflow. Fines concentration @ 83,000TSS (8.3% solids) with 91.5% of fines passing through 200 mesh screen.

| Polymer Treatment | ppm | TSS | Observations |
|---|---|---|---|
| 1). Cationic Coag | 10 ppm | 83,000 | No Effect-Total Shear |
| 2). Cationic Coag | 5 ppm | | |
| Anionic A/N | 10 ppm | — | No Effect-Total Shear |
| 3). Cationic Coag | 5 ppm | | |
| Anionic N | 10 ppm | 72,300 | Small Effect-Highly Sheared |
| 4). Cationic Coag | 5 ppm | | |
| Anionic L | 10 ppm | — | No Effect-Total Shear |

TABLE 1-continued

Granite fines slurry from quarry wash water and sand screw overflow. Fines concentration @ 83,000TSS (8.3% solids) with 91.5% of fines passing through 200 mesh screen.

| | Polymer Treatment | ppm | TSS | Observations |
|---|---|---|---|---|
| 5). | Cationic Coag | 5 ppm | | |
| | Anionic M | 10 ppm | — | No Effect-Total Shear |
| 6). | Cationic Coag | 5 ppm | | |
| | Anionic H | 10 ppm | — | No Effect-Total Shear |
| 7). | Cationic Coag | 5 ppm | | |
| | Anionic N | 10 ppm | | |
| | Cationic MAP | 10 ppm | 67,400 | Small Flocs-Shears with mixing |
| 8). | Cationic Coag | 5 ppm | | |
| | Anionic N | 10 ppm | | |
| | Cationic L | 10 ppm | 69,500 | Small Flocs-Shears with mixing |
| 9). | Cationic Coag | 5 ppm | | |
| | Anionic N | 10 ppm | | |
| | Cationic M | 10 ppm | 62,200 | Med Flocs-Shears with mixing |
| 10). | Cationic Coag | 5 ppm | | |
| | Anionic N | 10 ppm | | |
| | Cationic H | 10 ppm | 42,900 | Med/Large Flocs-Medium shear |
| 11). | Cationic Coag | 5 ppm | | |
| | Anionic N | 10 ppm | | |
| | Cationic B-M | 10 ppm | 8,450 | Large Flocs-Slight shear with mixing |
| 12). | Cationic Coag | 5 ppm | | |
| | Anionic N | 10 ppm | | |
| | Cationic B-H | 10 ppm | 97 | Large Strong Flocs-No Discernable Shear |

Cationic Coag = 20% active DADMAC, 200,000 MW
Anionic N = branched, or structured nonionic copolymer, 18,000,000 MW
Anionic A/N = blend of structured nonionic copolymer & low charge anionic AA copolymer
Anionic L = low anionic charge AA copolymer, 14,000,000 MW
Anionic M = medium anionic charge AA copolymer, 15,000,000 MW
Anionic H = high anionic charge AA copolymer, 15,000,000 MW
Cationic MAP = MAPTAC type cationic copolymer, 4,000,000 MW
Cationic L = low charge cationic acrylamide copolymer, 5,000,000 MW
Cationic M = medium charge cationic acrylamide copolymer, 5,000,000 MW
Cationic H = high charge (55%) cationic acrylamide copolymer, 7,000,000 MW
Cationic B = branched, or structured cationic acrylamide copolymer, 7–10,000,000 MW
— = did not run due to lack of flocculation
Flocs = flocculated particles
TSS = Total Suspended Solids, as measured by EPA 160.2 standard Table 1 clearly shows that the DADMAC coagulant, in combination with the structured nonionic copolymer and structured high charge cationic copolymer outperform all other combinations by a wide margin. Furthermore, the resultant low TSS shows the effect of the structured cationic copolymer when added in sequence with the other products. A further advantage of this structured cationic copolymer in this invention is the rapid settling of the solids formed, as well as high solids content of the settled solids (54%), before further dewatering. Resultant water is clean enough for recycle to process.

Example 2

TABLE 2

Sandstone fines slurry from quarry wash water and sand screw overflow. Fines concentration is 7350TSS (0.735% solids), with 100% of fines passing through 200 mesh screen. 92% passing through 325 mesh screen.

| | Polymer Treatment | ppm | TSS | Observations |
|---|---|---|---|---|
| 1). | No treatment | — | 7350 | No Treat |
| 2). | Cationic Coag | 5 ppm | — | No increase in size |
| 3). | Anionic N | 5 ppm | 6130 | small increase in size |
| 4). | Anionic M | 5 ppm | — | No increase |
| 5). | Anionic H | 5 ppm | — | No increase |
| 6). | Anionic N | 5 ppm | | |
| | Cationic B-H | 5 ppm | 1140 | Large flocs-undertreat |
| 7). | Anionic N | 5 ppm | | |
| | Cationic B-H | 10 ppm | 48 | Large/strong-clear water |
| 8). | Anionic N | 5 ppm | | |
| | Cationic H | 5 ppm | 3120 | Large flocs-start to break |
| 9). | Anionic N | 5 ppm | | |
| | Cationic H | 10 ppm | 883 | Large flocs-slight breakup |

Table 2 shows a similar effect to that in Table 1, but without the need for the cationic coagulant. Again, the effectiveness of the structured cationic copolymer to resist shear is clearly demonstrated, providing greater than 99.5% removal of fine size particles from the fluid medium.

Example 3

TABLE 3

A phosphate clay slurry resulting from the beneficiation of phosphate ore. The slurry primarily composed of various fine size bentonitic and other clay particles. 95% of fines pass through a 400 mesh screen. Fines concentration is 37,000TSS.

| | Polymer Treatment | ppm | TSS | Observations |
|---|---|---|---|---|
| 1). | Cationic Coag | 10 ppm | — | Micro flocculation |
| 2). | Cationic Coag | 10 ppm | — | Very slight flocs-no measurement |
| | Anionic N | 10 ppm | | |
| 3). | Cationic Coag | 10 ppm | | |
| | Anionic L | 10 ppm | 33,800 | Small flocs-very weak |
| 4). | Cationic Coag | 10 ppm | | |
| | Anionic M | 10 ppm | 30,700 | Slightly larger flocs-still weak |
| 5). | Cationic Coag | 10 ppm | | |
| | Anionic H | 10 ppm | — | Small flocs-very weak |
| 6). | Cationic Coag | 10 ppm | | |
| | Anionic M | 10 ppm | | |
| | Cationic MAP | 10 ppm | — | Small flocs-shearing badly |
| 7). | Cationic Coag | 10 ppm | | |
| | Anionic M | 10 ppm | | |
| | Cationic H | 10 ppm | 14,200 | Large flocs-starting to shear |
| 8). | Cationic Coag | 10 ppm | | |
| | Anionic M | 10 ppm | | |
| | Cationic B-H | 10 ppm | 2480 | Large strong flocs-slight shear |
| 9). | Cationic Coag | 10 ppm | | |
| | Anionic M | 10 ppm | | |
| | Cationic B-H | 15 ppm | 112 | Clear water-large strong flocs |

Codes are the same as Table 1
— = did not run due to lack of flocculation

Table 3 shows that by increasing the dosage of the structured cationic copolymer in the testing, a significant improvement in TSS of the "overflow" water can be attained. This type of material has historically resisted conventional treatment due to the high concentration of "swelling" clays. Flocculated particles gravity dried to over 40% solids in the atmosphere within 3 hours of testing. Typical drying beds require up to 18 months for material to reach this % solids. The obvious advantages of this invention, as demonstrated in Table 3, the shortening of the processing time, and huge reduction in the area needed to process the clay solids, as well as a reduction in process water needed due to the evaporation rate time.

Example 4

700 gpm of around 7.0% fine solids slurry is pumped from a set of sand screws in a Granite Quarry to two (2) vacuum assisted hydraulic centrifugal cyclones arranged in parallel. Each METPRO Supply Inc. unit is 15" in diameter, as measured at the feed chamber. Mass flow of fines to the cyclones being 29.5TPH solids. Laboratory TSS analysis shows untreated cyclone overflow to be 64,300, or 6.43%. A 10 ppm dosage of CCS-8624 cationic coagulant is added to the flow approximately 200' before the inlet to the cyclones. The cationic coagulant being diluted through an inline static mixer 100 to 1 with water.

A structured anionic/nonionic blended copolymer @ 0.25% solution strength, is inverted into an age tank and then pumped into the process stream at a dosage of 20 ppm, approximately 50' before the inlet to the cyclones. Finally, a structured cationic copolymer solution @ 0.40% solution strength is inverted into an age tank. This polymer solution is then added to the process stream at both 5' and 6" before the inlet to each cyclone @ 20 ppm based on total flow.

Underflow from the apex is controlled by the vortex finder vacuum valve located off the overflow piping of the cyclone. A full stream flow is obtained from the cyclone underflow into a base material holding bin for subsequent sale. Samples of the underflow solids are grabbed for moisture analysis. Fluid overflow samples are obtained from the inlet to the cyclone overflow holding tank for TSS analysis. Method of analysis is EPA 160.2.

TABLE 4

| Test # | Overflow TSS | Solids % Moisture Underflow |
|---|---|---|
| 1). Control-No Treatment | 64,300 | 67% |
| 2). Partial Treatment | | |
| Cationic Coag-10 ppm | | |
| Anionic/Nonionic-20 ppm | 36,200 | 64% |
| 3). Full Treatment | | |
| Cationic Coag-10 ppm | | |
| Anionic/Nonionic-20 ppm | | |
| Cationic Emulsion-20 ppm | 243 | 54% |

The dramatic reduction in TSS of the cyclone overflow indicates nearly complete removal of all fine size particles. This is especially noteworthy as the cyclones utilized are sized to remove only that fraction of solids that will not pass through a 200 mesh screen. The total reduction for the full treatment versus no treatment is 99.6%.

Water can now be returned to the process without the added cost of electricity to move the water to a settling pond offsite. Additionally, nearly 29.5 TPH of previously discarded material is now available for recycling and sale.

Conclusions, Ramifications, & Scope

As a result of the inventive process, a considerable reduction in equipment and accompanying cost is possible. For example, a considerable reduction in cost associated with the use of a thickening tank, or filtration units can be realized. Additionally, material is readily available for resale, or re-incorporation into the process. Water can be recycled quicker, and at lower power requirements and costs. Space is saved, along with much lower maintenance due to very few moving parts. Equipment wear is also minimized due to the lubricity imparted by the polymeric additives on typically abrasive fine size particles.

While the invention has been described in detail with reference to specific embodiments thereof, it will be apparent to persons skilled in the art that various changes and modifications can be made, and equivalents employed, without departing from the scope of the appended claims.

We claim:

1. A method for combining specific polymeric additives in a liquid stream containing fine suspended solid particles to enhance hydraulic centrifugal separator (cyclone) performance, the cyclone having an upsteam feed inlet coupled to a mixing chamber having an overflow outlet, a conical section being coupled to and terminating opposite the mixing chamber in a downstream discharge apex, the method comprising the steps of:

(a). introducing a liquid cationic coagulant, if necessary, into the liquid stream at a first distance upstream of the cyclone;

(b). introducing a an anionic copolymer blend solution into the liquid stream at a second distance upsteam of the cyclone;
(c). introducing an initial dose of cationic copolymer solution into the liquid stream at a third distance upstream of the feed inlet;
(d). introducing a second dose of the cationic copolymer solution at a fourth distance upstream of the cyclone feed inlet; then
(e). syphoning off through the overflow outlet an outflow fluid stream into a cone bottom tank;
(f). introducing additional cationic copolymer solution, if needed, through a polymer ring located just above the apex;
(g). remove flocculated solids settling in bottom of cone bottom tank; and
(h). discharge cyclone underflow solids through the apex.

2. The method for recovering fine size particles according to claim 1, wherein the particles are granite, limestone, sandstone, or igneous rock.

3. A method for recovering fine size particles according to claim 2, wherein
the hydraulic centrifugal separator discharges from 85–99.9% of all suspended solids, regardless of initial size, from the apex.

4. The method for recovering fine size particles according to claim 1, wherein the
particles are phosphatic clays.

5. A method according to claim 2 or 4 wherein the cationic coagulant
is a DADMAC type polymer with molecular weight of 200,000–500,000, and 100% charge, and active solids content of from 20% to dry powder (90+%).

6. A method according to claim 5, wherein the cationic coagulant
is diluted with water before injection into the fluid stream.

7. The method for recovering fine size particles according to claim 1, wherein
the particles are red mud solids left from the flashing operation in the Bayer Process.

8. A method according to claim 7, wherein
the anionic copolymer is an anionic hydroxamated polyacrylamide.

9. A method according to claim 4, wherein
the degree of hydroxamation of said polymer ranges from 1 to about 90 mole percent.

10. A method according to claim 7, wherein
the cationic copolymer ranges in charge from 2.5–60 mole %.

11. The method for recovering fine size particles according to claim 1, wherein
the particles are neutralization tailings from the titanium dioxide Chloride/Sulfate Process.

12. A method according to claim 2, 4, or 11 wherein the anionic copolymer blend solution further comprises
an emulsion that is inverted to 0.25–0.50% solution strength and aged before injection into the process stream.

13. A method according to claim 12, wherein
the anionic copolymer blend solution has an anionic charge ranges from 1–95 mole %.

14. A method according to claim 2, 4, 7, or 11 wherein the cationic copolymer further comprises
an emulsion that is inverted to 0.25–0.50% solution strength and aged before injection.

15. A method according to claim 14, wherein
the majority of the polymer solution is injected via a polymer ring immediately upstream of the feed inlet.

16. A method according to claim 15, wherein the cationic copolymer is in a range of 40–65 mole %.

17. A method according to claim 2, 4, 7, or 11 wherein
an additional dosage of cationic copolymer solution may be added via a polymer ring just upstream of the apex.

18. A method according to claim 2, 4, 7, or 11 wherein
materials discharged from the cyclone and cone bottom tank may be sent to a rotating screen (trommel), or pug mill for additional dewatering and material blending.

19. A method according to claim 11, wherein the anionic copolymer further comprises
structured nonionic polymer with a anionic charge of 0–2 mole %.

20. A method according to claim 2, 4, 7, or 11 wherein
an additional upper cone section can be added to increase cyclone efficiency.

21. The method for recovering fine size particle according to claim 1, wherein magnitudes of the first and second distances
are chosen for thorough mixing of the coagulant and copolymer with the fluid stream.

22. The method for recovering fine size particles according to claim 21, wherein magnitudes of the first and second distances
are chosen for optimal mixing with the fluid stream.

23. The method for recovering fine size particle according to claim 21, wherein the third distance less than the second and first distances.

24. The method for recovering fine size particles according to claim 1, wherein the third distance is between two feet and ten feet (2'–10').

25. The method for recovering fine size particles according to claim 1, wherein the fourth distance is directly in front of the feed inlet.

26. A method for combining specific polymeric additives in a liquid stream containing fine suspended solid particles to enhance cyclone performance, comprising the following steps of:
(a). introducing a liquid cationic coagulant, if necessary, into the liquid stream containing fine size particles, at sufficient distance from the cyclone for proper mixing:
(b). introducing an anionic copolymer blend solution into the liquid stream at optimum distance before the cyclone for proper mixing/dosing;
(c). introducing an initial dose of cationic copolymer solution into the liquid stream, at a distance of 10' to 2' in front of the cyclone feed inlet;
(d). introducing a second dose of the cationic copolymer solution directly in front of the cyclone feed inlet; then
(e). syphoning off through an overflow outlet an overflow fluid stream into a cone bottom tank;
(f). introducing additional cationic copolymer solution, if needed, through a polymer ring located just above the apex;
(g). removing flocculated solids settling in a bottom of the cone bottom tank through an automated dump valve controlled by level probes in said tank, with gravity flow, pump, or screw auger; and
(h). discharging cyclone underflow solids through the apex into material bin, conveyor, or stockpile.

* * * * *